US012752741B2

(12) United States Patent
Chang et al.

(10) Patent No.: US 12,752,741 B2
(45) Date of Patent: Oct. 6, 2026

(54) WIPER BLADE WITH MULTI-SEGMENT DECORATIVE COVER STRUCTURE

(71) Applicant: DANYANG UPC AUTO PARTS CO., LTD., Danyang (CN)

(72) Inventors: Che-Wei Chang, New Taipei City (TW); Cheng-Kai Yang, New Taipei City (TW); Chuan-Chih Chang, New Taipei City (TW)

(73) Assignee: DANYANG UPC AUTO PARTS CO., LTD., Zhenjiang (CN)

( * ) Notice: Subject to any disclaimer, the term of this patent is extended or adjusted under 35 U.S.C. 154(b) by 0 days.

(21) Appl. No.: 18/527,142

(22) Filed: Dec. 1, 2023

(65) Prior Publication Data

US 2025/0136051 A1 May 1, 2025

(30) Foreign Application Priority Data

Oct. 27, 2023 (CN) ......................... 202311416008.1

(51) Int. Cl.
*B60S 1/04* (2006.01)
*B60S 1/38* (2006.01)

(52) U.S. Cl.
CPC ........... *B60S 1/0491* (2013.01); *B60S 1/3801* (2013.01); *B60S 2001/3815* (2013.01)

(58) Field of Classification Search
CPC .... B60S 1/3806; B60S 1/0408; B60S 1/3801; B60S 1/0491
USPC ............ 15/257.01, 250.31, 250.361, 250.43, 15/250.44, 250.46
See application file for complete search history.

(56) References Cited

U.S. PATENT DOCUMENTS 8,966,706 B2 * 3/2015 Song ..................... B60S 1/3801 15/250.361
10,723,322 B2 7/2020 Young et al.
(Continued)

FOREIGN PATENT DOCUMENTS

CN 103764457 A 4/2014
WO 2013080694 A1 6/2013

OTHER PUBLICATIONS

Search Report dated Mar. 6, 2025 of the corresponding European patent application No. 24205374.2.

*Primary Examiner* — Katina N. Henson
(74) *Attorney, Agent, or Firm* — HDLS IPR SERVICES; Chun-Ming Shih

(57) ABSTRACT

A wiper blade includes a frame structure, a squeegee and a decorative cover structure. The frame structure includes a main frame, auxiliary frames and sub-frames. The auxiliary frames are rotatably connected two ends of the main frame. The sub-frames are loosely connected to two ends of the auxiliary frame. The sub-frames and the auxiliary frame are formed with inserting holes respectively. The squeegee is connected to each sub-frame. The decorative cover structure includes a main cover, auxiliary covers and sub-covers covering the main frame, the auxiliary frame and the sub-frame, respectively. Each auxiliary cover has an inserting bar protruded therefrom and correspondingly inserted into each inserting hole. Accordingly, no connection is formed between any two of the main cover, auxiliary covers and sub-covers so that the squeegee will not be obstructed or limited by the decorative cover structure when wiping on vehicle glass.

5 Claims, 11 Drawing Sheets

(56) References Cited

U.S. PATENT DOCUMENTS

| | | | | |
|---|---|---|---|---|
| 2014/0053361 A1* | 2/2014 | Amano | B60S 1/4064 | 15/250.46 |
| 2014/0189974 A1* | 7/2014 | Yang | B60S 1/3801 | 15/250.32 |
| 2016/0280187 A1* | 9/2016 | Satou | B60S 1/3801 | |
| 2017/0057464 A1* | 3/2017 | Tolentino | B60S 1/3801 | |

* cited by examiner

WIPER BLADE WITH MULTI-SEGMENT DECORATIVE COVER STRUCTURE

BACKGROUND

Technical Field

The disclosure relates to a wiper blade, particularly to a wiper blade with a multi-segment decorative cover structure.

Related Art

Regarding wipers used on a vehicle glass, a related-art wiper includes a squeegee and a plurality of frames connected to each other and movable relative to each other. The squeegee is connected to parts of the frames and disposed across them. Most of the frames of a related-art wiper are uncovered and this leads to an issue of appearance.

A related-art wiper is equipped with a decorative cover for overcoming the aforementioned issue. Most of the aforementioned frames are covered by the same decorative cover, so that the decorative cover covers most of the frames to beautify the related-art wiper.

However, the related-art wiper has the decorative cover additionally and therefore leads to hinders to the movements of most frames, as will be described in detail later. The vehicle glass has a curved surface, and the frames will move on the vehicle glass correspondingly to the curved surface thereof when wiping. However, this original corresponding movement is hindered and restricted by the decorative cover formed as one piece, so that the movements originally performed by the frames may be invalid and it is difficult to wipe the water droplets from the vehicle glass. This has been criticized for a long time.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

An object of the disclosure is to provide a wiper blade with a multi-segment decorative cover structure, the decorative cover structure is divided into multiple segments without any connection therebetween so that a squeegee is prevented from being obstructed or limited by the decorative cover structure when wiping on vehicle glass.

To accomplish the above object, the disclosure provides a wiper blade with a multi-segment decorative cover structure, which includes a frame structure, a squeegee and a decorative cover structure. The frame structure includes a main frame, at least two auxiliary frames and multiple sub-frames. A middle of each auxiliary frame is respectively rotatably connected two ends of the main frame. A middle of each sub-frame is respectively loosely connected to two ends of each auxiliary frame. Each of part of each sub-frame and each auxiliary frame is formed with an inserting hole. The squeegee is connected to each sub-frame. The decorative cover structure includes a main cover, at least two auxiliary covers and at least two sub-covers. The main cover covers the main frame. Each auxiliary cover covers each auxiliary frame. Each sub-cover covers part of each sub-frame. Each auxiliary cover has an inserting bar protruded therefrom and correspondingly inserted into the inserting hole of each auxiliary frame. Each sub-cover has an inserting bar protruded therefrom and correspondingly inserted into the inserting hole of each sub-frame.

In comparison with the related art, the disclosure includes the following functions. The decorative cover structure is segmented to multiple sections (including the main cover, the auxiliary covers and sub-covers) without any connection therebetween, so as to prevent from being obstructed and restricted by the decorative cover structure when the squeegee is wiping on the vehicle glass.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 11:
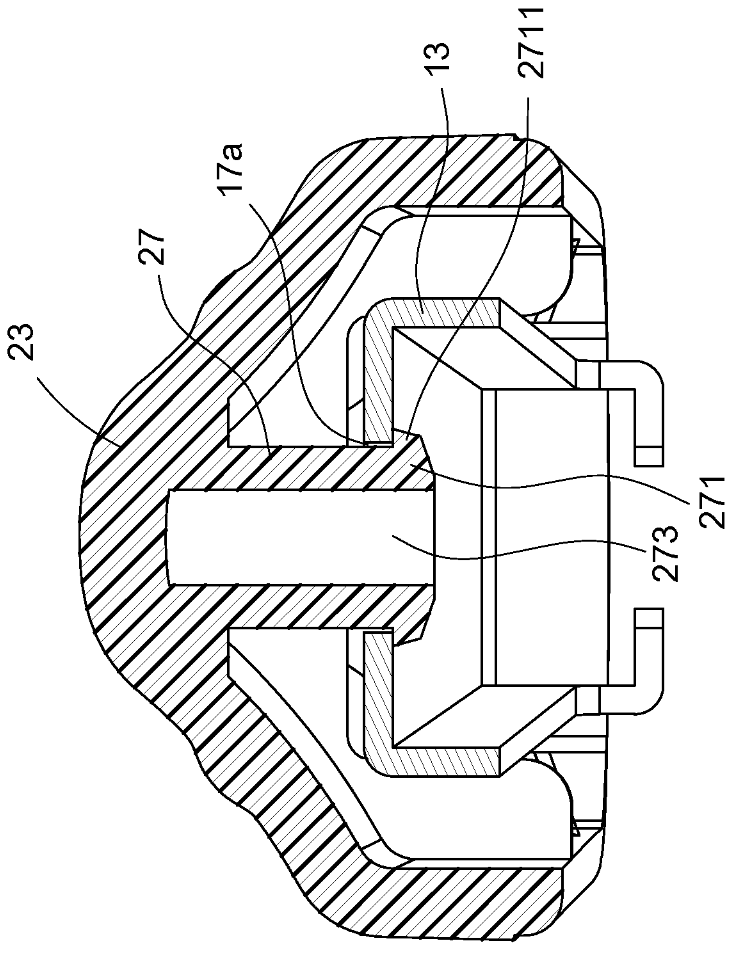
FIG. 11 is a cross-sectional view of the second embodiment of the wiper blade of the disclosure.
Figure 12:
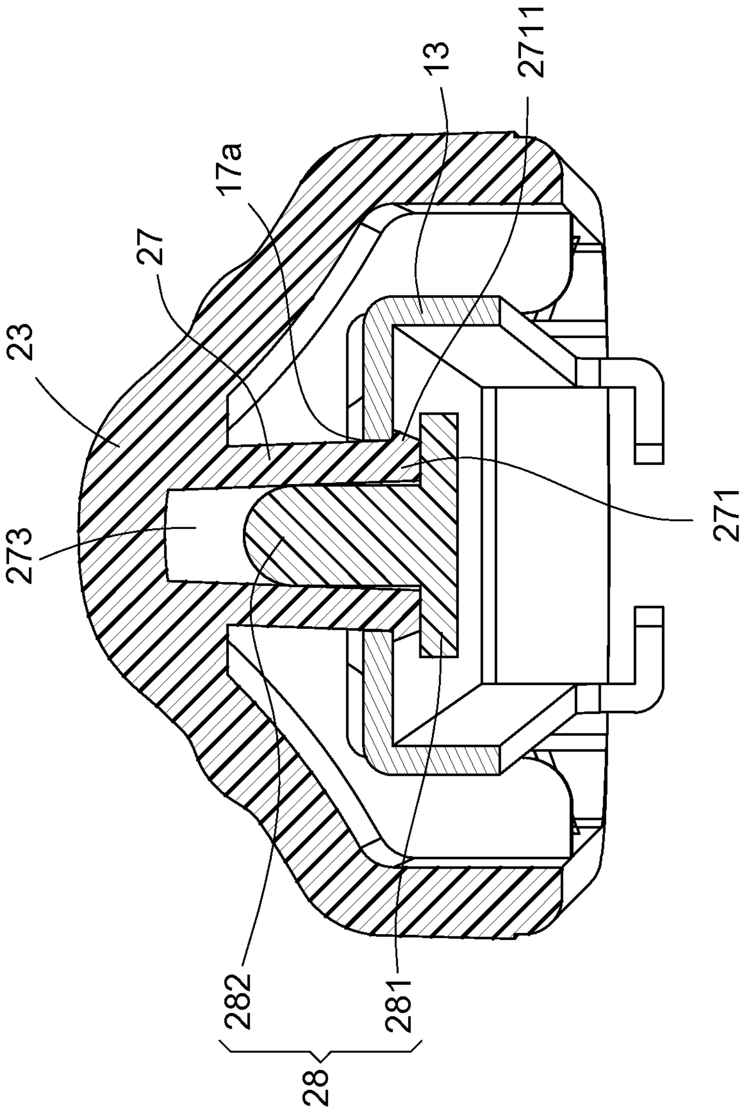
FIG. 12 is a cross-sectional view of the third embodiment of the wiper blade of the disclosure.

The disclosure provides a wiper blade with a multi-segment decorative cover structure. FIGS. 1-10 show the first embodiment. FIGS. 11-12 show the second and third embodiments, respectively.

As shown in FIGS. 1-10, the first embodiment of the wiper blade with a multi-segment decorative cover structure (hereinafter "wiper") of the disclosure includes a frame structure 1, a squeegee 3 and a decorative cover structure 2. In detail, multiple connecting members 4 are included.

The frame structure 1 includes a main frame 11, at least two auxiliary frames 12 and multiple sub-frames 13. In this embodiment, the auxiliary frames 12 may be two in number, and the sub-frame 13 is four in number, which is two times thereof. In other embodiments of a larger wiper which is not shown in the figures, the amounts of the auxiliary frames 12 and the sub-frames 13 may be increased correspondingly. It is noted that each of the main frame 11, the auxiliary frames 12 and the sub-frames 13 can be divided into a left segment, a right segment and a middle segment connected between the left segment and the right segment (all not labeled).

A middle of each auxiliary frame 12 is respectively connected two ends of the main frame 11 and rotatable. In detail, a bolt P is inserted between the main frame 11 and the auxiliary frame 12 to make the auxiliary frame 12 movable relative to the main frame 11 about the bolt P as a shaft as a seesaw.

A middle of each sub-frame 13 is respectively loosely connected to two ends of each auxiliary frame 12. The squeegee 3 is connected to the sub-frames 13 respectively and disposed across the sub-frames 13. The middle of each auxiliary frame 12 is formed with an inserting hole 17. The inserting hole 17 and the insertion point of the bolt P is staggered. Among the sub-frames 13, a middle of the sub-frame 13 connected to two opposite outer ends between the two auxiliary frames 12 is formed with an inserting hole **17*a*. The inserting hole 17*a* and the elongated hole 16*a*** are staggered.

Figure 4:
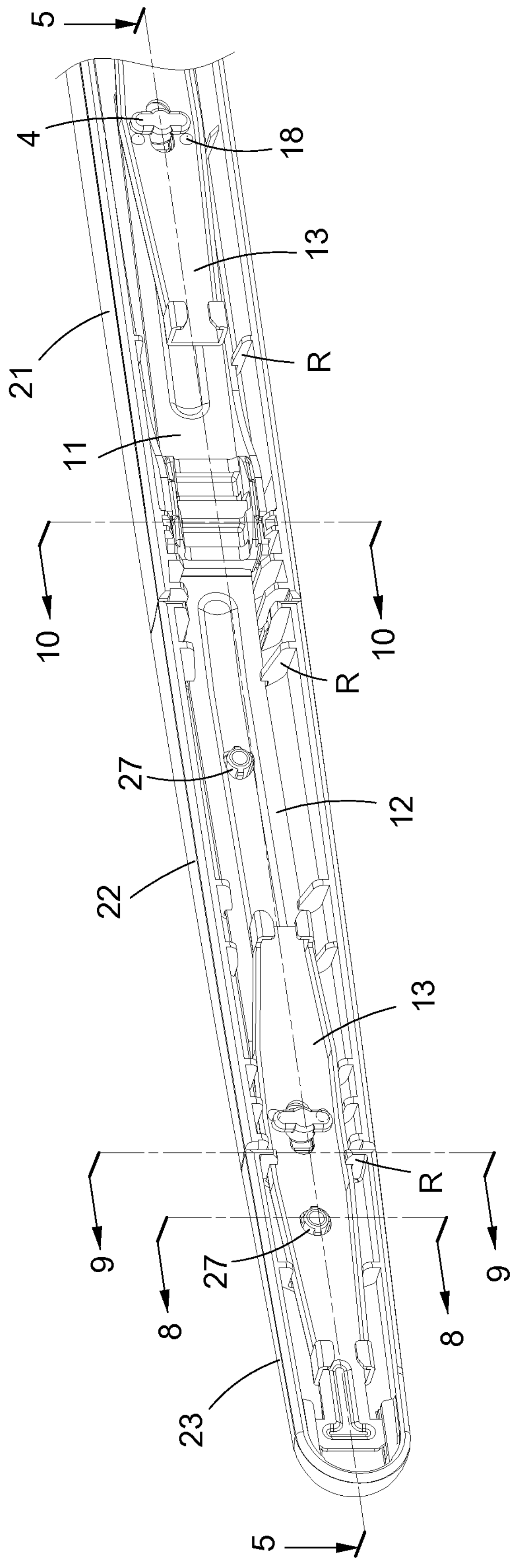
FIG. 4 is a bottom schematic view of the decorative cover structure and the frame structure of the first embodiment of the wiper blade of the disclosure after being combined.
Figure 6:
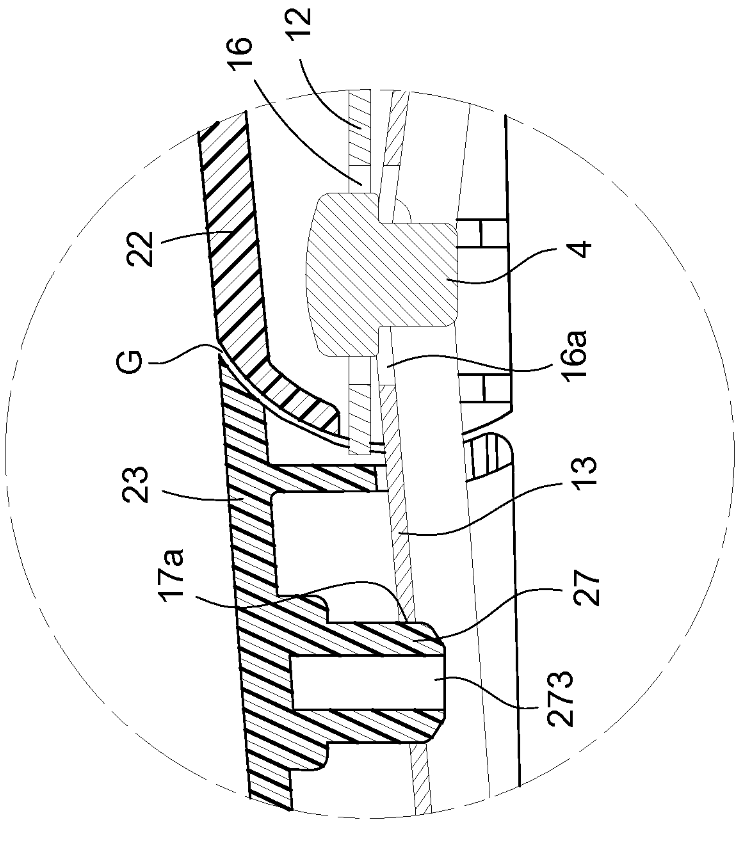
FIG. 6 is a partially enlarged view of a part of the wiper blade of the disclosure in FIG. 5.

The aforementioned loose connection may be any various available connection. Specifically, the connecting member 4 is connected between the auxiliary frame 12 and the sub-frame 13 to make the sub-frame 13 movable relative to the auxiliary frame 12 about the connecting member 4 as a shaft. In detail, each of two ends of the each auxiliary frame 12 is formed with an elongated hole (capsule-shaped hole). The middle of each sub-frame 13 is also formed with an elongated hole **16*a*. The connecting member 4 is inserted into the elongated hole 16 of the auxiliary frame 12 and the elongated hole 16*a* of the sub-frame 13. The connecting member 4 will be movably clamped between the auxiliary frame 12 and the sub-frame 13 after it is rotated to an angle (such as 90 degrees) by a user. As shown in FIGS. 4 and 6, the connecting member 4 which has been inserted and rotated to intercross with the elongated hole 16*a***.

The decorative cover structure 2 includes a main cover 21, at least two auxiliary covers 21 and at least two sub-covers 23. The main cover 21 covers the main frame 11. Each auxiliary cover 22 covers each auxiliary frame 12. The sub-covers 23 cover the sub-frames 13 respectively. Each auxiliary cover 22 has an inserting bar 27 protruded therefrom. The inserting bars 27 are, respectively, tightly inserted into the inserting holes 17 corresponding thereto on the auxiliary frames 12. Each sub-cover 23 has an inserting bar 27 protruded therefrom. The inserting bars 27 are, respectively, tightly inserted into the inserting holes **17*a* corresponding thereto on the sub-frames 13. Thereby, the decorative covers (means the main cover 21, the auxiliary covers 22 and the sub-covers 23, hereinafter the same) can be respectively fixed to the frames (means the main frame 11, the auxiliary frames 12 and the sub-frames 13**, hereinafter the same).

Figure 8:
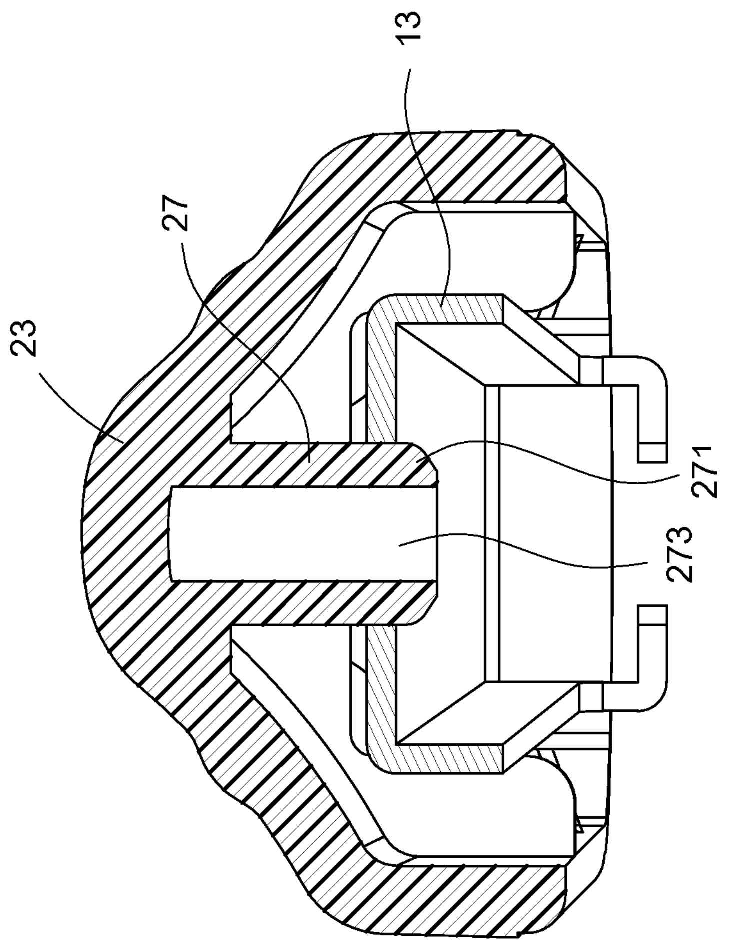
FIG. 8 is a cross-sectional view of the wiper blade of the disclosure along line 8-8 in FIG. 4.

It is noted that, as shown in FIGS. 6 and 8, for a tight insertion, each inserting bar 27 may be a hollow inserting bar, so that the inserting bar 27 has a hollow portion 273. The inserting bars 27 are respectively extended from inner walls of the auxiliary covers 22 and the sub-covers 23, each inserting bar 27 has a free end portion 271 at an end along a protruding direction thereof. The hollow portion 273 is formed with an opening at the free end portion 271. As a result, the inserting bar 27 can be, elastically, radially compressed at the hollow portion 273 so as to make the inserting bars 27 able to be tightly inserted into the inserting holes 17, **17*a*** respectively.

Figure 9:
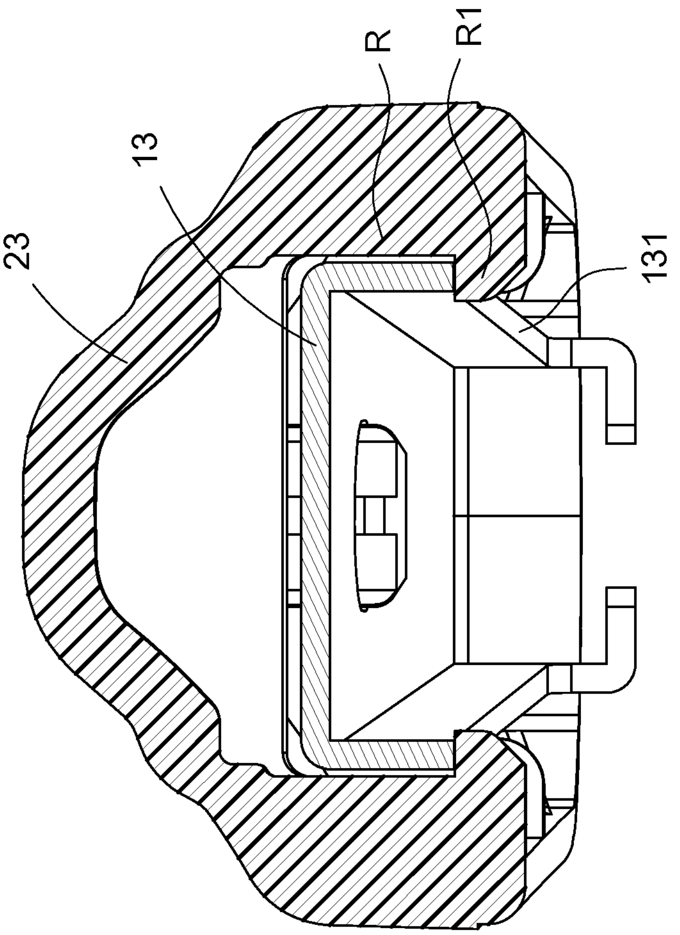
FIG. 9 is a cross-sectional view of the wiper blade of the disclosure along line 9-9 in FIG. 4.
Figure 10:
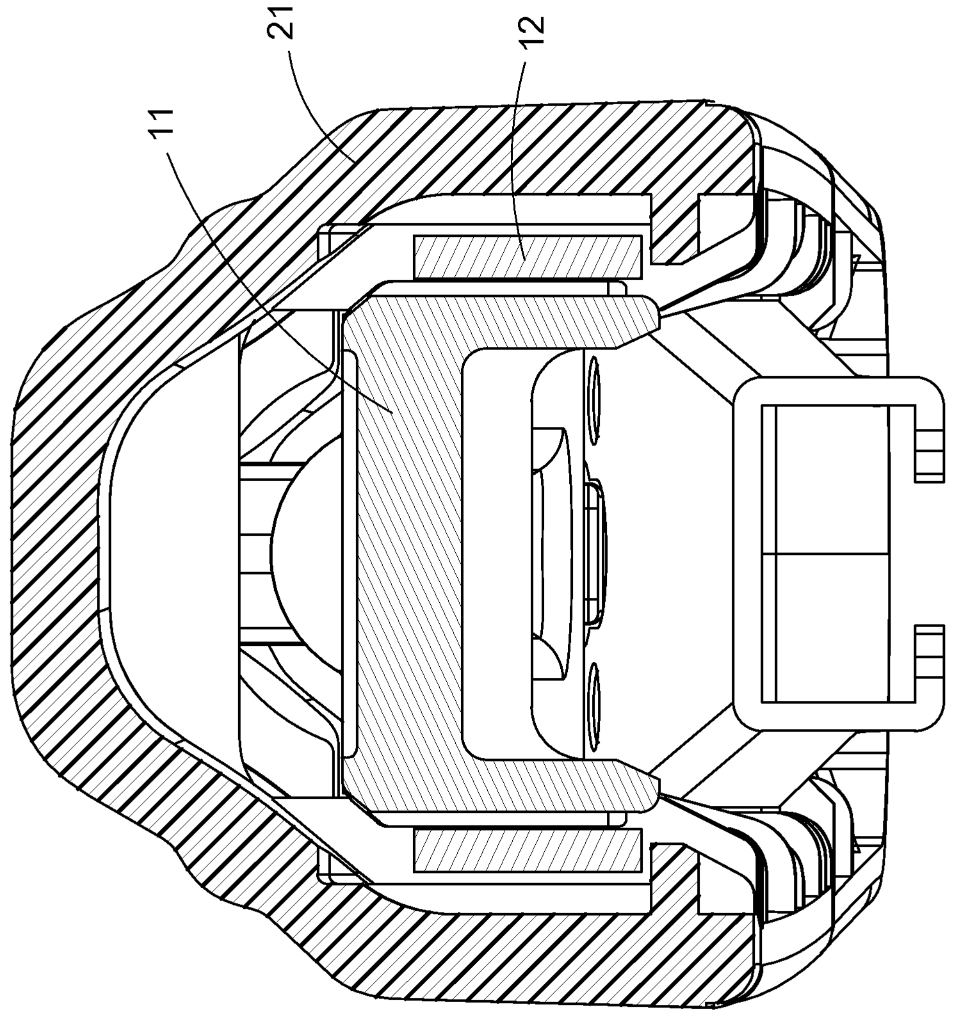
FIG. 10 is a cross-sectional view of the wiper blade of the disclosure along line 10-10 in FIG. 4.

In an embodiment, as shown in FIGS. 4 and 9, on an inner wall of each of the main cover 21, the auxiliary covers 22 and the sub-covers 23 is disposed with at least one pair of ribs R. Each rib R has a buckling protrusion R1. The pair of ribs R of the main cover 21 uses its buckling protrusions R1 to buckle the bottom of the main frame 11, The pair of ribs R of the auxiliary cover 22 uses its buckling protrusions R1 to buckle the bottom of the auxiliary frame 12. The pair of ribs R of the sub-cover 23 uses its buckling protrusions R1 to buckle the bottom 131 of the sub-frame 13 (as shown in FIG. 9). Accordingly, each decorative cover can be more firmly fixed to each frame.

Figure 1:
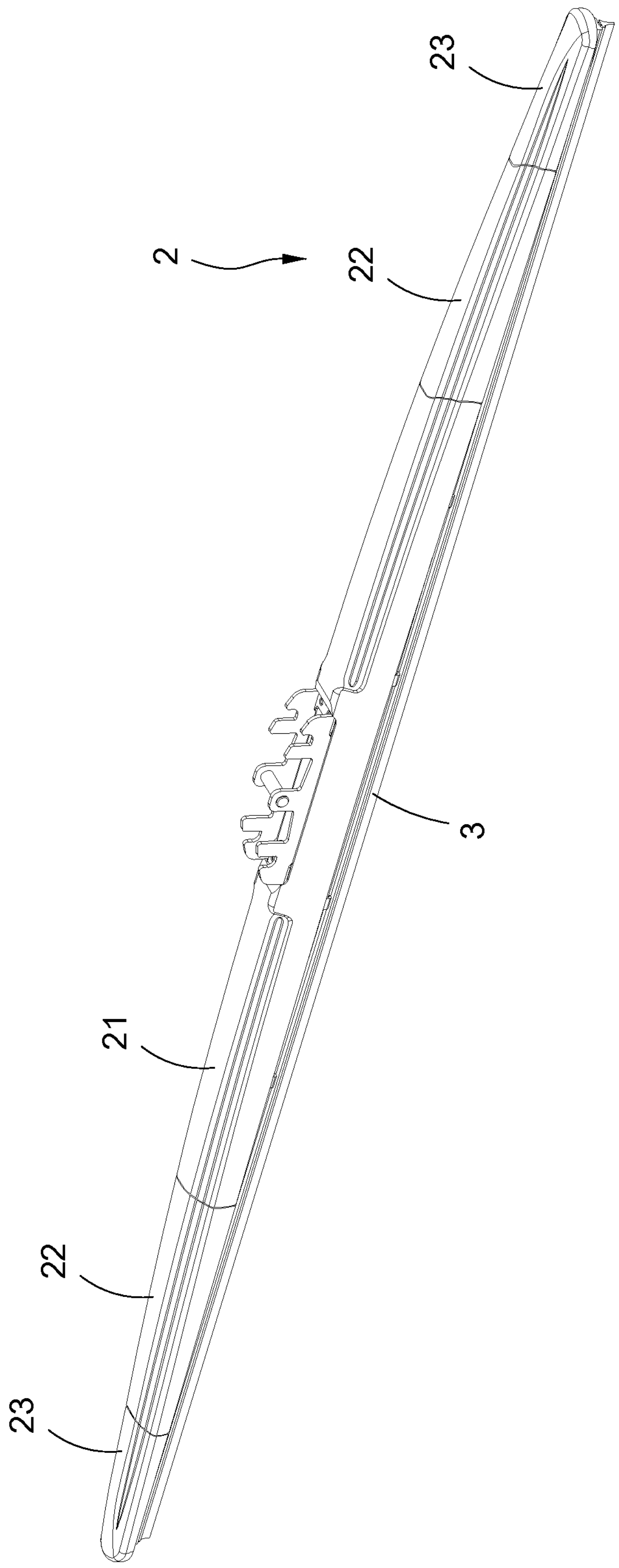
FIG. 1 is a perspective view of the first embodiment of the wiper blade of the disclosure.
Figure 2:
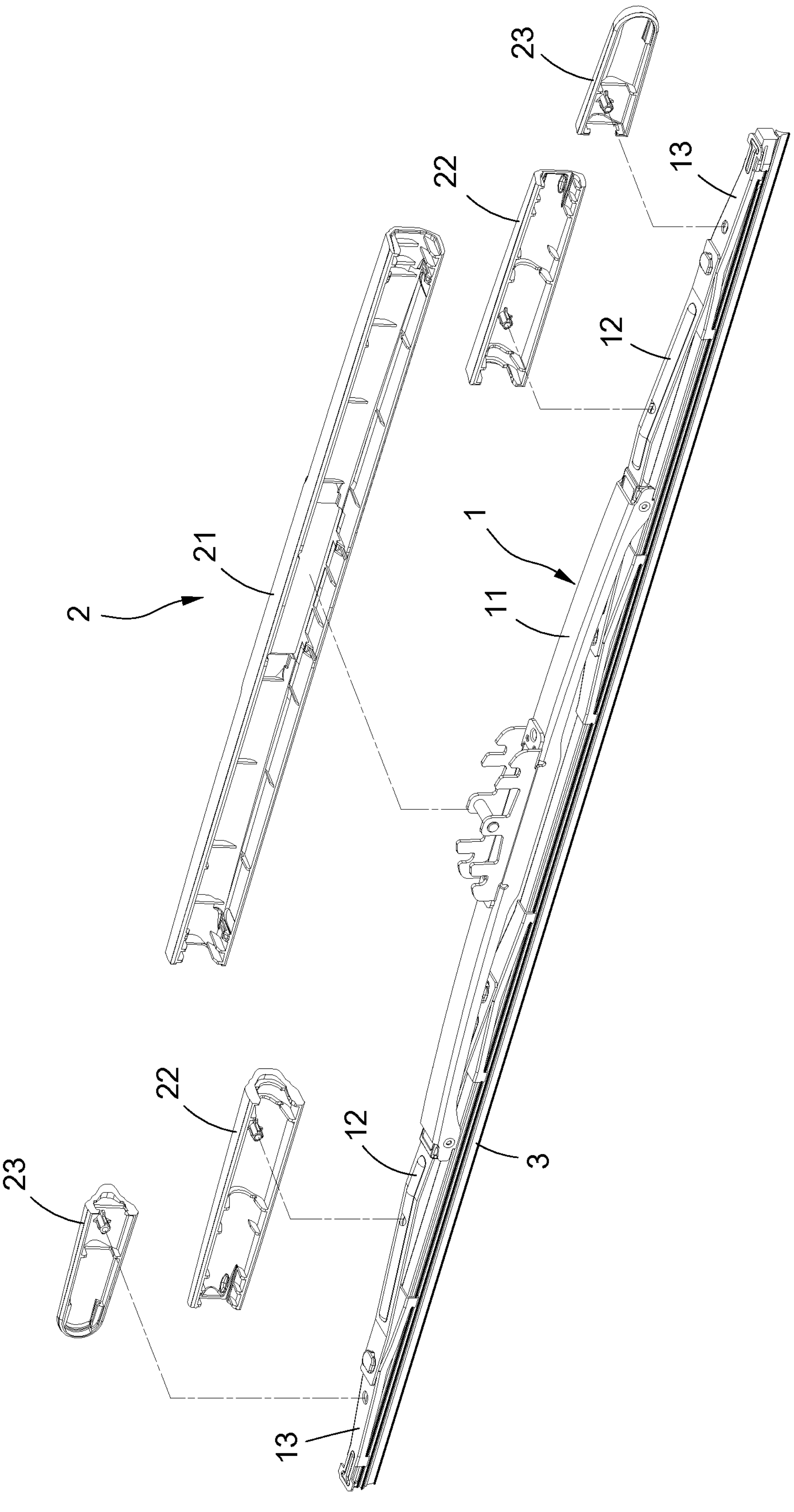
FIG. 2 is an exploded view of the first embodiment of the wiper blade of the disclosure before assembling the decorative cover structure.
Figure 3:
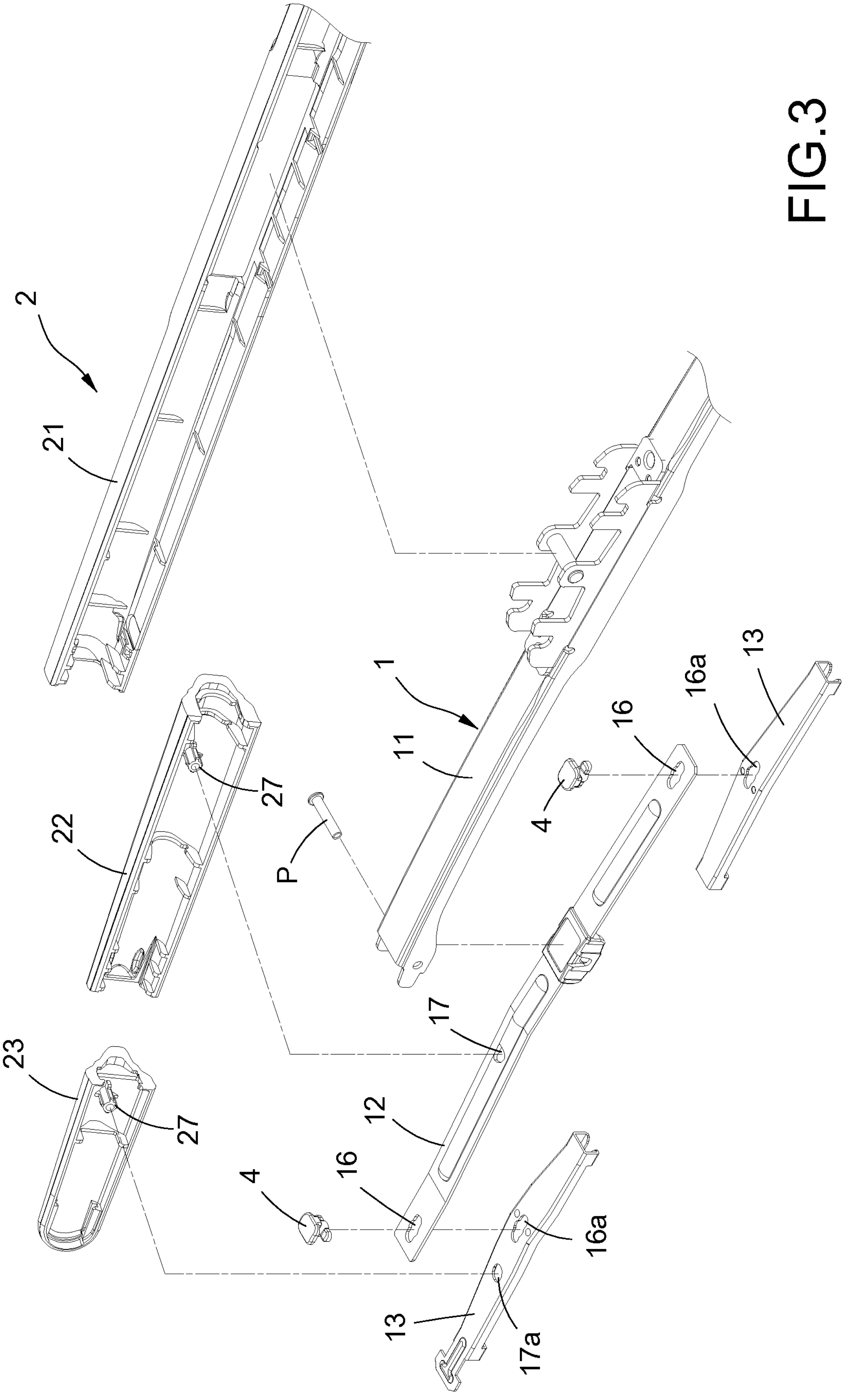
FIG. 3 is an exploded view of the decorative cover structure and the frame structure of the first embodiment of the wiper blade of the disclosure.

Moreover, as shown in FIGS. 3-4, a pair of bumps 18 protruded from the bottom side of each sub-frame 13 may be further provided and located at two opposite sides of the elongated hole **16*a*. Thereby, after a user has inserted and rotated the connecting member 4 an angle as aforementioned operation, a long edge of a bottom (not labeled) of the connecting member 4, which is exposed from a bottom side of the sub-frame 13, will be blocked by the pair of bumps 18 to make the connecting member 4** not easy to rotate under the condition of being blocked.

Thus, because the decorative cover structure 2 is separated into multiple segments (including the main cover 21, at least two auxiliary covers 22 and at least two sub-covers 23) without any connection therebetween, when the squeegee 3 connected among the sub-frames 13 moves in various directions along a curved surface on the vehicle glass and, it will not be obstructed and restricted by the decorative cover structure. Thus, the squeegee 3 can associate with each sub-frames 13 to perform various vibrations smoothly so as to let the squeegee 3 smoothly follow the curved surface of vehicle glass to be elastically deformed. In other words, the wiper blade of the disclosure can be used to ensure that the squeegee 3 is attached on vehicle glass to wipe to and fro and water droplets on the vehicle glass can be cleanly wiped away.

Figure 5:
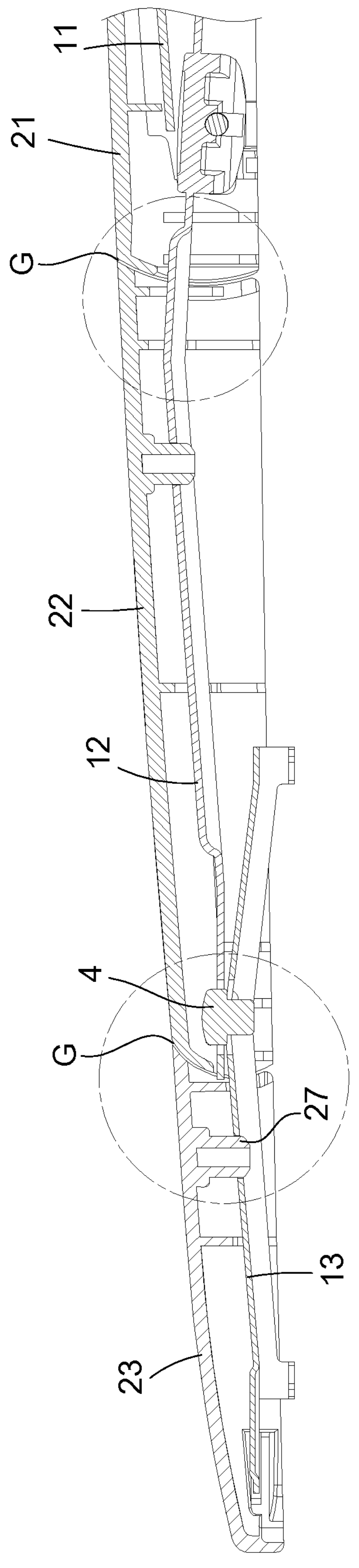
FIG. 5 is a cross-sectional view of the wiper blade of the disclosure along line 5-5 in FIG. 4.
Figure 7:
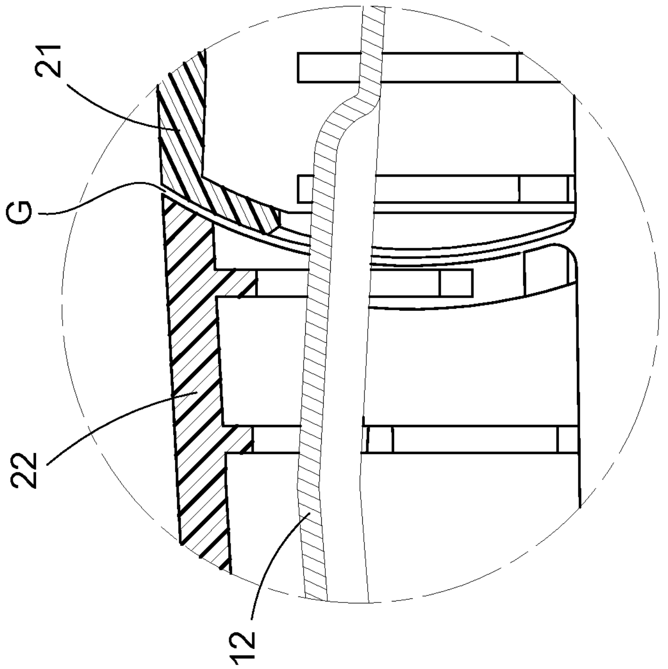
FIG. 7 is a partially enlarged view of another part of the wiper blade of the disclosure along line 5-5 in FIG. 4.

In addition, as shown in FIGS. 5-7, a gap G is formed between the main cover 21 and each auxiliary cover 22 and between each auxiliary cover 22 and each sub-cover 23. When the wiper blade of the disclosure is wiping on vehicle glass reciprocatingly, no contact exists between the main cover 21 and each auxiliary cover 22 and between each auxiliary cover 22 and each sub-cover 23 due to the gap G, so that no collision noise (such as collision noise caused by the contact between the main cover 21 and each auxiliary cover 22) will be generated. In addition, because of a small width of each gap G, snow cannot enter the gap G.

As shown in FIG. 11, which is the second embodiment of the wiper blade of the disclosure, the second embodiment is roughly the same as the aforementioned first embodiment, and the difference is the structural change of each inserting bar 27.

In the second embodiment, each inserting bar 27 may further have a flange 2711 protruded from a periphery of the free end portion 271 thereof. After insertion is completed, the flange 2711 of each inserting bar 27 corresponds to each inserting hole 17, **17*a* to respectively reversely fasten the bottom side of the auxiliary frame 12 and the bottom side of the sub-frame 13 so as to enhance the fixing effect of each inserting bar 27**.

As shown in FIG. 12, which is the third embodiment of the wiper blade of the disclosure, the third embodiment is roughly the same as the aforementioned second embodiment, and the difference is the structural change of each inserting bar 27.

In the third embodiment, the inserting bar 27 of each auxiliary cover 22 and each sub-cover 23 is further disposed with a rod plug 28. The rod plug 28 includes a cap portion 281 and a plug portion 282. The plug portion 282 is upright connected to the cap portion 281. Each plug portion 282 is correspondingly inserted and plugged into the hollow portion 273 of each inserting bar 27, and the diameter of each inserting bar 27 will be enlarged after the insertion so as to further improve the tightness between the inserting bar 27 and the inserting holes 17, 17*a* respectively. Each cap portion 281 covers the free end portion 271 of each inserting bar 27 and makes the buckling protrusion R1 able to be clamped between the cap portion 281 and the bottom side of the auxiliary frame 12 and clamped between the cap portion 281 and the bottom side of the sub-frame 13. Thereby, the fixing effect of each inserting bar 27 can be further enhanced.

In sum, the wiper blade with a multi-segment decorative cover structure of the disclosure may achieve the expected object and effect and solve drawbacks of related art.

While this disclosure has been described by means of specific embodiments, numerous modifications and variations could be made thereto by those skilled in the art without departing from the scope and spirit of this disclosure set forth in the claims.

What is claimed is:

1. A wiper blade comprising:

a frame structure, comprising a main frame, at least two auxiliary frames and multiple sub-frames, a middle of each auxiliary frame being respectively rotatably connected to two ends of the main frame, a middle of each sub-frame being respectively loosely connected to two ends of each auxiliary frame, and the sub-frame located outmost and each auxiliary frame both being formed with a round inserting hole at a center;

a squeegee, connected to each sub-frame; and a decorative cover structure, comprising a main cover, at least two auxiliary covers and at least two sub-covers, the main cover covering the main frame, each auxiliary cover covering each auxiliary frame, each sub-cover covering part of each sub-frame, each auxiliary cover comprising an inserting bar protruded therefrom and correspondingly inserted into the inserting hole of each auxiliary frame, and each sub-cover comprising an inserting bar protruded therefrom and correspondingly inserted into the inserting hole of the sub-frame located outmost, wherein the inserting bar of each auxiliary cover and the inserting bar of each sub-cover are respectively a hollow round column comprising a hollow portion therein, an end of each inserting bar comprises a flange protruded from a periphery thereof and an opening communicated to the corresponding hollow portion;

wherein the main frame, the auxiliary frames and the sub-frames are non-connected with each other;

wherein before each inserting bar inserts into each round inserting hole, an outer diameter of each inserting bar is slightly greater than an inner diameter of each round inserting hole;

wherein while each inserting bar inserts into each round inserting hole, each inserting bar is elastically compressed through each hollow portion and each opening along a radial direction, so as to be tightly inserted into and circumferentially contacted each round inserting hole, and the flange of each inserting bar reversely fasten the auxiliary frame and the sub-frame at the round inserting hole corresponding thereto;

wherein each inserting bar comprises a rod plug comprising a plug portion and a cap portion, the plug portion is correspondingly inserted and plugged into the hollow portion to tightly fix the inserting bar in the round inserting hole, and the cap portion clamps and fixes the flange with the corresponding auxiliary cover or the corresponding sub-cover.

2. The wiper blade of claim 1, wherein each of the main cover, the auxiliary covers and the sub-covers are disposed with at least one pair of ribs comprising a buckling protrusion, the pair of ribs of the main cover is buckled with the main frame respectively by the buckling protrusions thereon, the pair of ribs of the auxiliary cover is buckled with the auxiliary frame respectively by the buckling protrusions thereon, and the pair of ribs of the sub-cover is buckled with the sub-frame respectively by the buckling protrusions thereon.

3. The wiper blade of claim 1, further comprising a plurality of connecting members, wherein each of two ends of each auxiliary frame is formed with an elongated hole, the middle of each sub-frame is also formed with an elongated hole, the connecting member is inserted into the elongated hole of the auxiliary frame and the elongated hole of the sub-frame, and the connecting member is loosely clamped between the auxiliary frame and the sub-frame.

4. The wiper blade of claim 3, wherein each sub-frame is further protruded with a pair of bumps located on two opposite sides of the elongated hole of the sub-frame, and the connecting member is blocked to rotate by the pair of bumps.

5. The wiper blade of claim 1, wherein a gap is formed between the main cover and each auxiliary cover and between each auxiliary cover and each sub-cover.

* * * * *